(12) United States Patent
Suehiro et al.

(10) Patent No.: US 11,428,997 B2
(45) Date of Patent: Aug. 30, 2022

(54) LIQUID CRYSTAL PANEL

(71) Applicant: Sharp Kabushiki Kaisha, Osaka (JP)

(72) Inventors: Daisuke Suehiro, Sakai (JP);
Tatsuhiko Suyama, Sakai (JP); Atsushi Aoki, Sakai (JP); Daiji Kitagawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 323 days.

(21) Appl. No.: 16/898,597

(22) Filed: Jun. 11, 2020

(65) Prior Publication Data

US 2020/0409223 A1 Dec. 31, 2020

Related U.S. Application Data

(60) Provisional application No. 62/867,248, filed on Jun. 27, 2019.

(51) Int. Cl.
*G02F 1/1333* (2006.01)
*G02F 1/1343* (2006.01)

(52) U.S. Cl.
CPC .... *G02F 1/134309* (2013.01); *G02F 1/13338* (2013.01); *G02F 2201/123* (2013.01)

(58) Field of Classification Search
None
See application file for complete search history.

(56) References Cited

U.S. PATENT DOCUMENTS

2012/0287093 A1* 11/2012 Gotoh ................. G06F 3/04184
  345/204
2019/0179484 A1* 6/2019 Jang ...................... G06F 3/0446
2020/0174607 A1* 6/2020 Tominaga ............... G06F 3/044

FOREIGN PATENT DOCUMENTS

CN 107422507 A * 12/2017
JP 10-39842 A 2/1998

* cited by examiner

*Primary Examiner* — Thanh Nhan P Nguyen
(74) *Attorney, Agent, or Firm* — Keating & Bennett, LLP

(57) ABSTRACT

A liquid crystal panel is provided which is capable of performing displaying with sufficiently high quality while reducing power consumption. The liquid crystal panel 20 includes a plurality of pixel electrodes, a plurality of counter electrodes which are smaller in number and larger in individual size than the plurality of pixel electrodes, a liquid crystal layer disposed between the plurality of pixel electrodes and the plurality of counter electrodes, and a control unit configured to control a voltage applied to the plurality of pixel electrodes and a voltage applied to the plurality of counter electrodes. In a predetermined case, the control unit operates in a power saving operation mode in which the control unit performs control such that a fixed voltage is applied to the plurality of pixel electrodes and a voltage corresponding to an image signal is applied to the plurality of counter electrodes.

7 Claims, 9 Drawing Sheets

LIQUID CRYSTAL PANEL

BACKGROUND

1. Field

The following disclosure relates to a liquid crystal panel.

2. Description of the Related Art

In a liquid crystal panel provided in a battery-driven electronic device such as a portable terminal, it is required not only to perform displaying so as to satisfy a requirement of a user but also to reduce power consumption as much as possible.

For example, Japanese Unexamined Patent Application Publication No. 10-39842 proposes a portable terminal configured to display a pictogram in a standby state while reducing power consumption. This portable terminal has a liquid crystal panel that operates such that in a standby state, only counter electrodes in an area where the pictogram is displayed are in a selected state, and the other counter electrodes are in a non-selected state.

However, in the liquid crystal panel provided on this portable terminal, the image displayed in the standby state is limited to pictograms. Besides the area in which the image is displayed is limited. Therefore, this liquid crystal panel does not provide a sufficient display performance in a power saving operation mode.

SUMMARY

According to an aspect of the disclosure, there is provided a liquid crystal panel including a plurality of pixel electrodes, a plurality of counter electrodes which are smaller in number and larger in individual size than the plurality of pixel electrodes, a liquid crystal layer disposed between the plurality of pixel electrodes and the plurality of counter electrodes, and a control unit configured to control a voltage applied to the plurality of pixel electrodes and a voltage applied to the plurality of counter electrodes, wherein in a predetermined case, the control unit operates in a power saving operation mode in which the control unit performs control such that a fixed voltage is applied to the plurality of pixel electrodes and a voltage corresponding to an image signal is applied to the plurality of counter electrodes.

DESCRIPTION OF THE EMBODIMENTS

Figure 1:
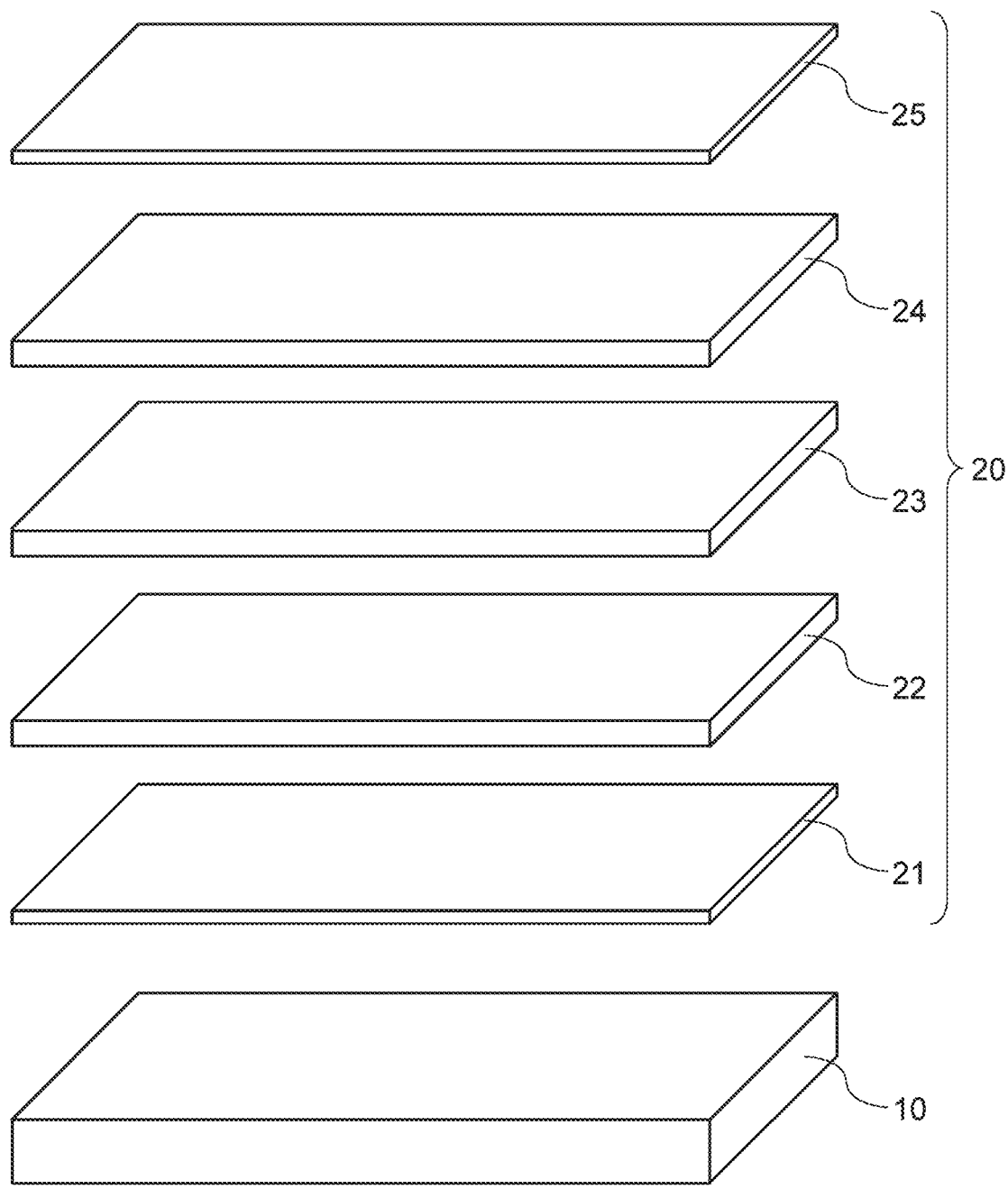
FIG. 1 is an exploded perspective view showing a schematic configuration of a liquid crystal display apparatus including a liquid crystal panel according to a first embodiment.

Embodiments of the present invention are described in detail below with reference to drawings. In the drawings, the same or similar parts are denoted by the same reference numerals and duplicated descriptions thereof are omitted. In addition, in order to make the description easy to understand, in the drawings referred to in the following description, a configuration may be shown in a simplified or schematic manner, or some of constituent members may be omitted. Furthermore, dimensional ratios between constituent members shown in the respective drawings do not necessarily indicate actual dimensional ratios.

First Embodiment

FIG. 1 is an exploded perspective view showing a schematic configuration of a liquid crystal display apparatus 1 including a liquid crystal panel 20 according to a first embodiment. As shown in FIG. 1, the liquid crystal display apparatus 1 includes a backlight 10 and the liquid crystal panel 20. The liquid crystal panel 20 includes a lower polarizing plate 21, a lower glass substrate 22, a liquid crystal layer 23, an upper glass substrate 24, and an upper polarizing plate 25, which are laminated in this order. Hereinafter, directions in the liquid crystal display apparatus 1 are defined as follows. A direction as seen from the backlight 10 to the liquid crystal panel 20 is referred to as an upward direction, and the opposite direction is referred to as a downward direction.

The backlight 10 emits planar light in the upward direction. The backlight 10 includes a light source such as an LED (Light Emitting Diode), a CCFL (Cold Cathode Fluorescent Lamp), or the like. The lower polarizing plate 21 selectively transmits the light emitted from the backlight 10 such that a light component vibrating in a first direction is allowed to pass through.

The liquid crystal layer 23 is disposed between the lower glass substrate 22 and the upper glass substrate 24. The lower glass substrate 22 is provided with pixel electrodes, and the upper glass substrate 23 is provided with counter electrodes. The pixel electrodes and the counter electrodes cause a voltage to be applied to a liquid crystal in the liquid crystal layer 23 disposed therebetween. The orientation of the liquid crystal changes depending on the applied voltage, and the vibration direction of the light allowed to pass through the liquid crystal layer 23 is controlled by the orientation of the liquid crystal.

The upper glass substrate 24 is also provided with a color filter that selectively transmits a light component with a specific wavelength (a color) of the light that has passed through the liquid crystal layer 23. For example, the color filter includes filter elements that transmit red light, filter elements that transmit green light, and filter elements that transmit blue light, which are arranged in a predetermined pattern (for example, in a stripe pattern or in a mosaic pattern). One pixel electrode is provided for each filter element (each subpixel) of the pattern of the color filter.

The upper polarizing plate 25 selectively transmits a light component vibrating in a second direction of the light that has passed through the upper glass substrate 24.

Methods of displaying an image on the liquid crystal panel 20 are described below by way of example for a case in which the first direction and the second direction are perpendicular to each other and for a case where the first direction and the second direction are parallel to each other wherein the lower polarizing plate 21 transmits a light component vibrating in the first direction, while the upper polarizing plate 25 transmits a light component vibrating in the second direction.

In the case where the first direction and the second direction are perpendicular to each other, when the light having a component that vibrates in the first direction transmitted through the lower polarizing plate 21 is subjected to the changing of the vibration direction by the liquid crystal, the result is an increase in a component that vibrates in the second direction. The resultant increased component passes through the upper polarizing plate 25. On the other hand, if the light having a component that vibrates in the first direction transmitted through the lower polarizing plate 21 is not subjected to the changing of the vibration direction by the liquid crystal, no increase occurs in the component that vibrates in the second direction, and the component is blocked by the upper polarizing plate 25.

In the case where the first direction and the second direction are parallel to each other, when the light having a component that vibrates in the first direction transmitted through the lower polarizing plate 21 is subjected to the changing of the vibration direction by the liquid crystal, the result is a reduction in a component that vibrates in the second direction. The reduced component is blocked by the upper polarizing plate 25. On the other hand, if the light having the component that vibrates in the first direction transmitted through the lower polarizing plate 21 is not subjected to the changing of the vibration direction by the liquid crystal, no reduction occurs in the component that vibrates in the second direction, and the component passes through the upper polarizing plate 25.

As described above, whether the liquid crystal can change the vibration direction of light depends on the orientation of the liquid crystal. The orientation of the liquid crystal is controlled by the magnitude of the voltage applied to the liquid crystal via the pixel electrode and the counter electrode. Thus, the transmittance of each subpixel is controlled by the pixel electrode and the counter electrode thereof. Therefore, the liquid crystal panel 20 displays an image by controlling the transmittance of each subpixel.

Figure 2:
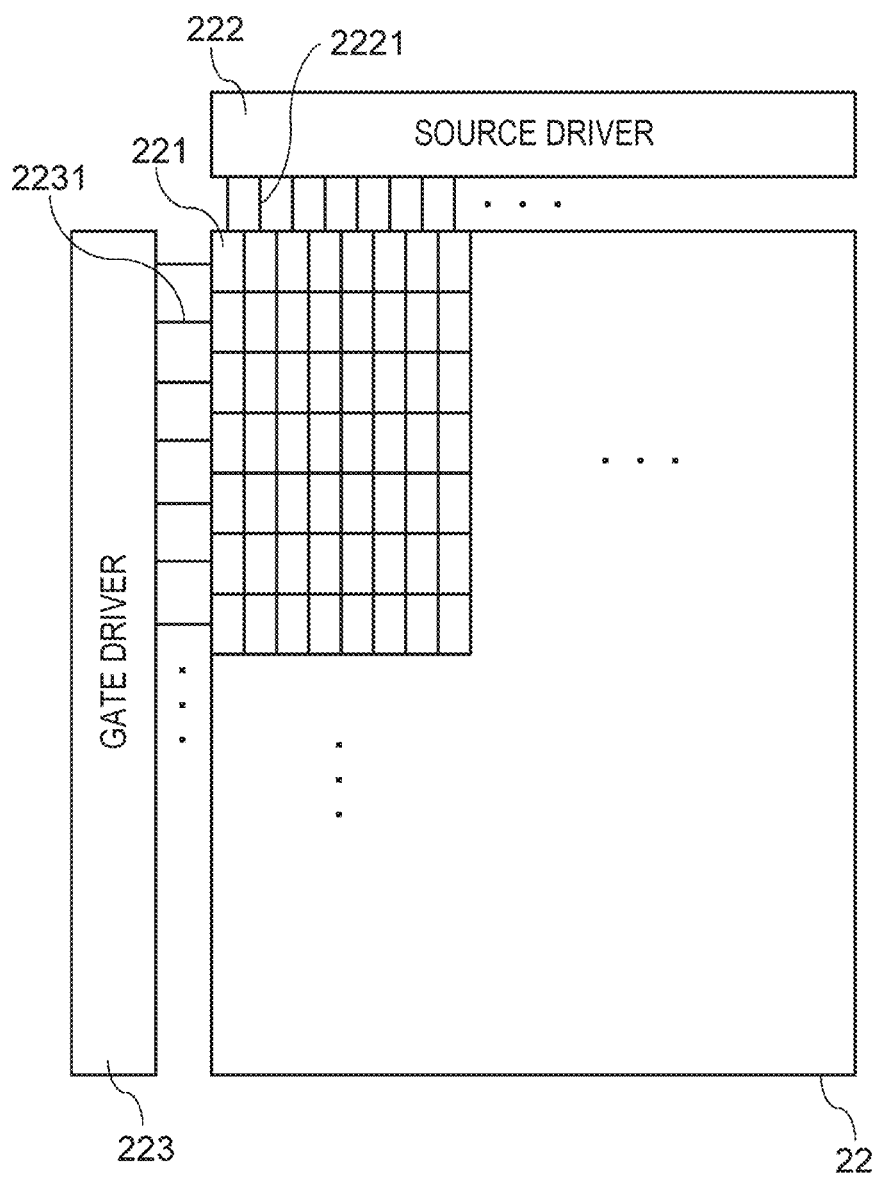
FIG. 2 is a block diagram illustrating a configuration of pixel electrodes.

Next, the pixel electrodes and the counter electrodes are described. FIG. 2 is a block diagram illustrating a configuration of pixel electrodes 221. As shown in FIG. 2, the pixel electrodes 221 are formed on the lower glass substrate 22. Each pixel electrode 221 is driven by a source driver 222 and a gate driver 223. The source driver 222 is connected with the same number of source wirings 2221 as the number of columns of pixel electrodes 221. The gate driver 223 is connected with the same number of driver wirings 2231 as the number of rows of pixel electrodes 221.

Figure 3:
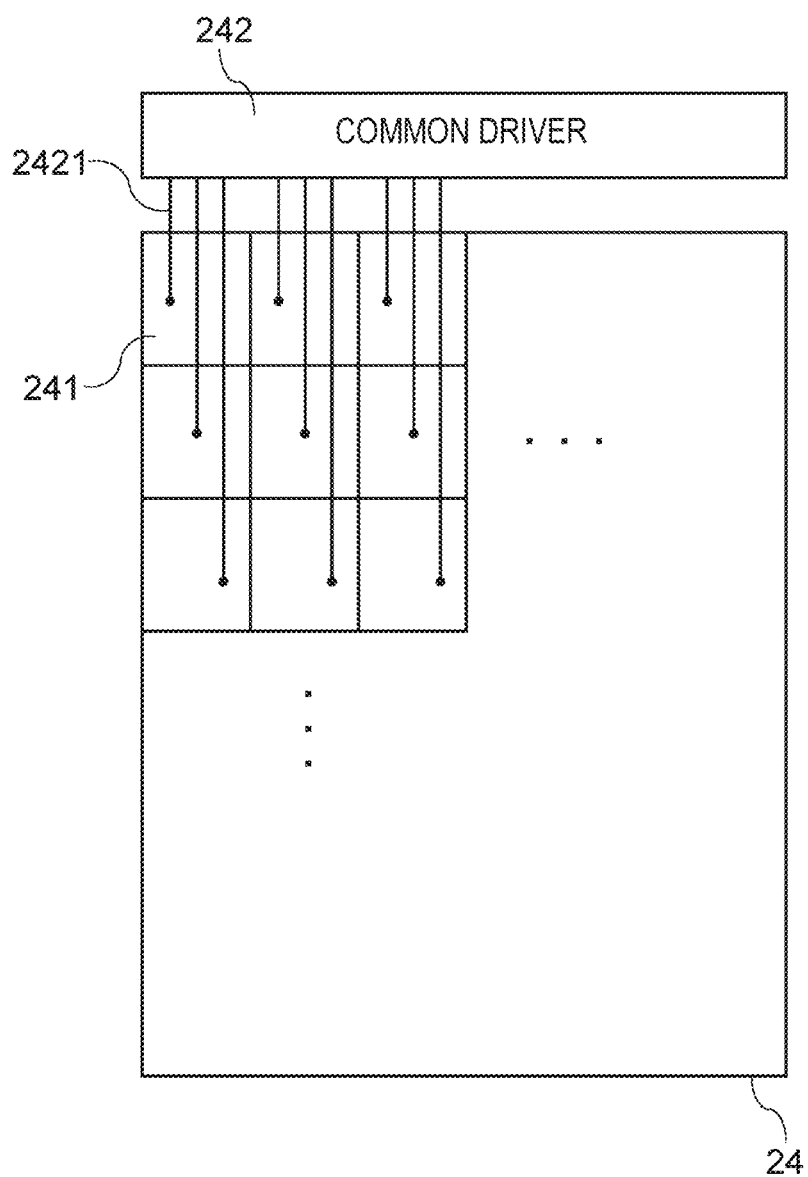
FIG. 3 is a block diagram illustrating a configuration of counter electrodes.

FIG. 3 is a block diagram illustrating a configuration of counter electrodes 241. As shown in FIG. 3, the counter electrodes 241 are formed on the upper glass substrate 24. The counter electrodes 241 are driven by the common driver 242. The common driver 241 is connected with as many common wirings 2421 as the number of counter electrodes 241. The common wirings 2421 are connected to the respective counter electrodes 241. The number of counter electrodes 241 is smaller than the number of the pixel electrodes 221, and the size of each counter electrode 241 is larger than the size of each pixel electrode 221. For example, a plurality of pixel electrodes 221 are disposed so as to face one counter electrode 241.

A surface on which the pixel electrodes 221 are arranged and a surface on which the counter electrodes 241 are arranged are approximately equal in size. Each pixel electrode 221 can be regarded as having a size corresponding to a size obtained by dividing the surface as many times as there are pixel electrodes 221, and each counter electrode 241 can be regarded as having a size corresponding to a size obtained by dividing the surface as many times as there are counter electrodes 241. Therefore, the number of times the surface is divided into the size of one pixel electrode 221 is smaller than the number of times the surface is divided into the size of counter electrode 241.

Figure 4:
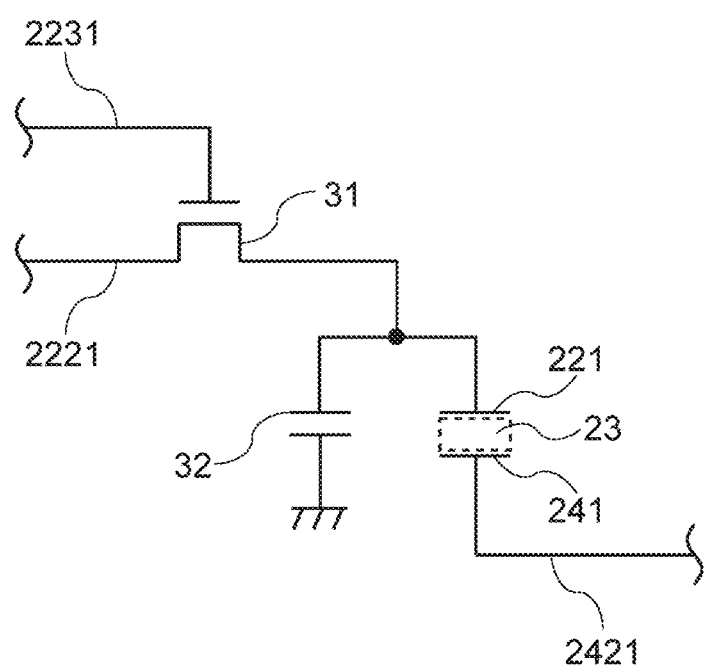
FIG. 4 is a block diagram illustrating an equivalent circuit of a pixel circuit.

FIG. 4 is a block diagram illustrating an equivalent circuit of a pixel circuit 30. The pixel circuit 30 shown in FIG. 4 is provided for each subpixel as with the pixel electrodes 221. Each pixel circuit 30 includes on pixel electrode 221. Note that in FIG. 4, the counter electrode 241 is illustrated as if it has the same size as the pixel electrode 221, but the counter electrode 241 is actually larger than the pixel electrode 221. Each counter electrode 241 opposes a plurality of pixel electrodes 221, and is shared by a plurality of pixel circuits 30.

As shown in FIG. 4, the pixel circuit 30 includes a TFT (Thin-Film-Transistor) 31, an auxiliary capacitor 32, a pixel electrode 221, and a counter electrode 241. The TFT 31 is formed, for example, as an n-channel type FET. A source of the TFT 31 is connected to a source wiring 2221 and a gate of the TFT 31 is connected to a gate wiring 2231. In FIG. 2, TFTs 31 that are connected to respective pixel electrodes 221 located in one same column are connected to one same source wiring 2221 and one same gate wiring 2231.

The drain of the TFT 31 is connected to one end of the auxiliary capacitor 32 and to the pixel electrode 221. The other end of the auxiliary capacitor 32 is grounded. Common wirings 2421 are connected to the respective counter electrodes 241.

In the pixel circuit 30, when a voltage for turning on the TFT 31 is applied from the gate wiring 2231, a voltage applied from the source wiring 2221 is applied to the pixel electrode 221. In this situation, the voltage applied from the source wiring 2221 is also applied to one end of the auxiliary capacitor 32 thereby charging the auxiliary capacitor 32. On the other hand, a voltage is applied to the counter electrode 241 from the common wiring 2421. In this situation, a voltage corresponding to a voltage difference between the pixel electrode 221 and the counter electrode 241 is applied to the liquid crystal layer 23. As a result, the orientation of the liquid crystal included in the liquid crystal layer 23 is controlled and an image is displayed.

Figure 5:
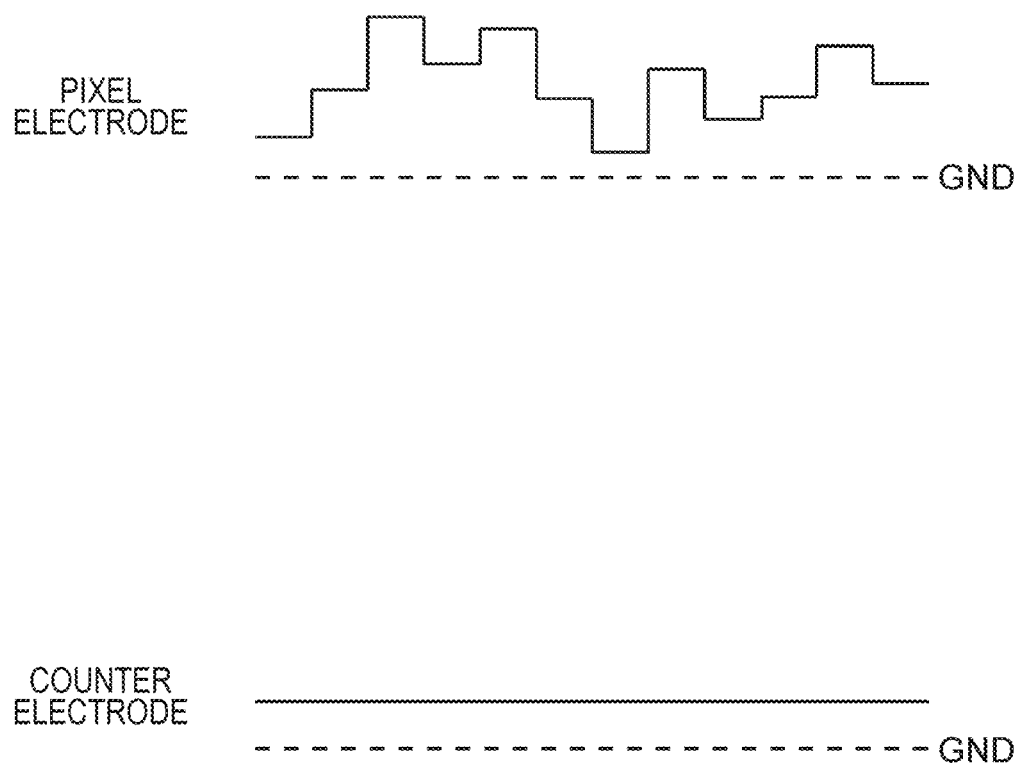
FIG. 5 is a graph showing respective voltages of a pixel electrode and a counter electrode when a liquid crystal panel operates in a normal operation mode.

Next, operation modes of the liquid crystal panel 20 are described. The liquid crystal panel 20 operates in, for example, two operation modes. FIG. 5 is a graph showing respective voltages of a pixel electrode 221 and a counter electrode 241 when the liquid crystal panel 20 operates in a normal operation mode. Note that FIG. 5 shows voltages of pixel electrodes located in 221 in same one column and counter electrodes 241 located in one same column.

As shown in FIG. 5, in a case where the liquid crystal panel 20 operates in the normal operation mode, a voltage corresponding to an image signal is applied to the pixel electrode 221. On the other hand, a voltage having a fixed magnitude is applied to the counter electrode 241. In this case, since the voltage difference between the pixel electrode 221 and the counter electrode 241 corresponds to the image signal, an image corresponding to the image signal is displayed.

Figure 6:
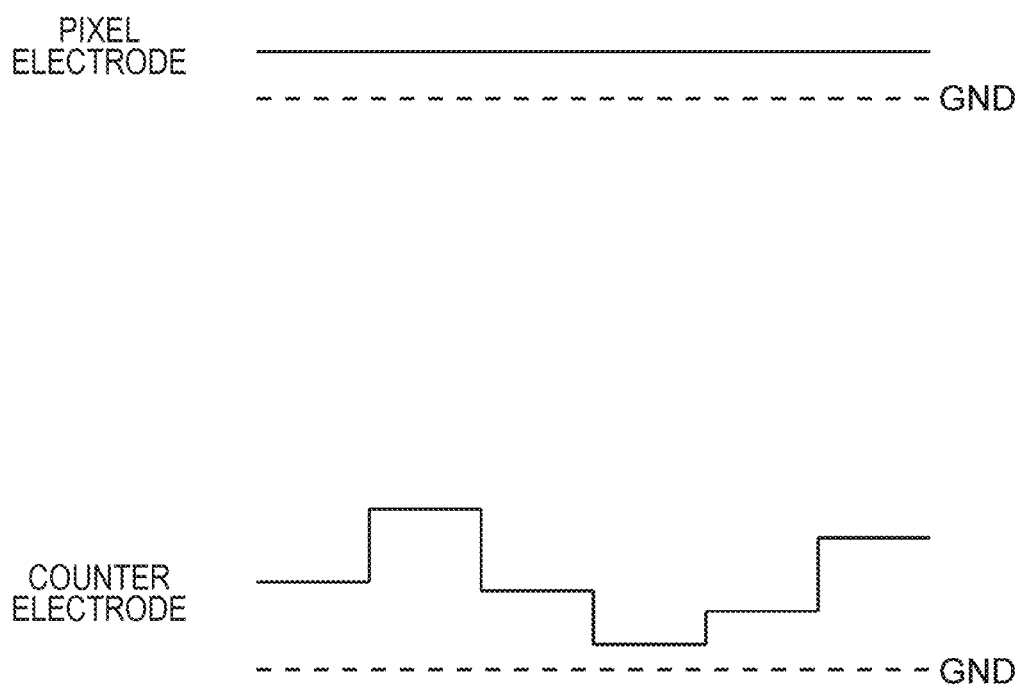
FIG. 6 is a graph showing respective voltages of a pixel electrode and a counter electrode when a liquid crystal panel operates in a power saving operation mode.

FIG. 6 is a graph showing respective voltages of a pixel electrode 221 and a counter electrode 241 when a liquid crystal panel 20 operates in a power saving operation mode. Note that as in FIG. 5, FIG. 6 shows voltages of pixel electrodes located in 221 in same one column and counter electrodes 241 located in one same column.

As shown in FIG. 6, in the case where the liquid crystal panel 20 operates in the power saving operation mode, a voltage with a fixed magnitude is applied to the pixel electrode 221. On the other hand, a voltage corresponding to an image signal is applied to the counter electrode 241. Also In this case, as in the normal operation mode shown in FIG. 5, since the voltage difference between the pixel electrode 221 and the counter electrode 241 corresponds to the image signal, an image corresponding to the image signal is displayed. However, as described above, the counter electrodes 241 are larger in size and smaller in number than the pixel electrodes 221. Therefore, the resolution of the image displayed in the power saving operation mode is lower than that of the image displayed in the normal operation mode.

When the liquid crystal panel 20 operates in the normal operation mode, the source drivers 222 apply the same number of voltages to the source wirings 2221 as the number of the pixel electrodes 221. On the other hand, when the liquid crystal panel 20 operates in the power saving operation mode, the common driver 242 applies the same number of voltages to the common wirings 2421 as the number of counter electrodes 241 that are smaller in number than the pixel electrodes 221. Therefore, in the power saving operation mode, the number of times the voltage is applied to the wiring is smaller than in the normal operation mode, which results in a reduction in the power consumption.

Figure 7:
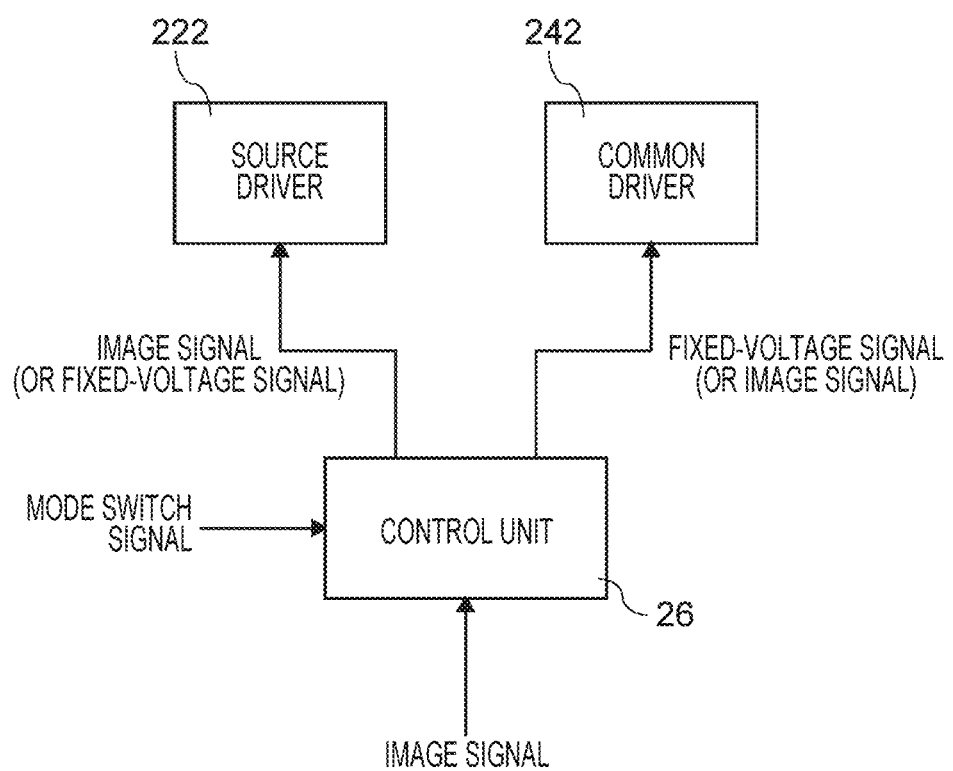
FIG. 7 is a block diagram illustrating a control unit provided in a liquid crystal panel according to the first embodiment.

Next, a control unit that operates in the normal operation mode and the power saving operation mode is described. FIG. 7 is a block diagram illustrating a control unit 26 provided in the liquid crystal panel 20 according to the first embodiment. The control unit 26 is realized using an arithmetic operation apparatus such as a CPU (Central Processing Unit) and a storage apparatus such as a semiconductor memory.

As shown in FIG. 7, in an operation in the normal operation mode, the control unit 26 supplies an image signal to the source driver 222 such that a voltage corresponding to an image signal is applied to the pixel electrode 221. Furthermore, the control unit 12 applies a fixed voltage signal to the common driver 242 such that a voltage having a fixed magnitude is applied to the counter electrode 241.

In the power saving operation mode, in order to apply a voltage with a fixed magnitude to the pixel electrode 221, the control unit 26 supplies a fixed voltage signal to the source driver 222. Furthermore, in order to apply a voltage corresponding to the image signal to the counter electrode 241, the control unit 12 supplies the image signal to the common driver 242.

The control unit 26 determines, based a mode switch signal, whether to operate in the normal operation mode or the power saving operation mode. The mode switch signal is, for example, a signal that causes the liquid crystal panel 20 to go into a standby state (a sleep state) or a signal that causes the liquid crystal panel 20 to go into an activated state. Note that the signal that causes the liquid crystal panel 20 to go into the standby state may be the same as the signal that causes an electronic device such as a portable terminal including the liquid crystal panel 20 to go into the standby state. Furthermore, the signal for activating the liquid crystal panel 20 may be the same as the signal for activating the electronic device such as the portable terminal including the liquid crystal panel 20.

For example, in a case where the liquid crystal panel 20 is in a portable terminal, when a user presses a power switch, the mode switch signal is input to the control unit 26. Note that each time the user presses the power switch, the signal for setting the standby state and the signal for setting the activation state are alternately input to the control unit 26. The power switch may be a physical switch or a virtual switch realized by an image and a touch panel.

When the signal for causing into the standby state is input, the control unit 26 gets into operation in the power saving operation mode.

As a result, the liquid crystal panel 20 also gets into operation in the power saving operation mode. On the other hand, when the signal for causing setting into the activated state is input, the control unit 26 gets into operation in the normal operation mode. As a result, the liquid crystal panel 20 also gets into operation in the normal operation mode.

Figure 8:
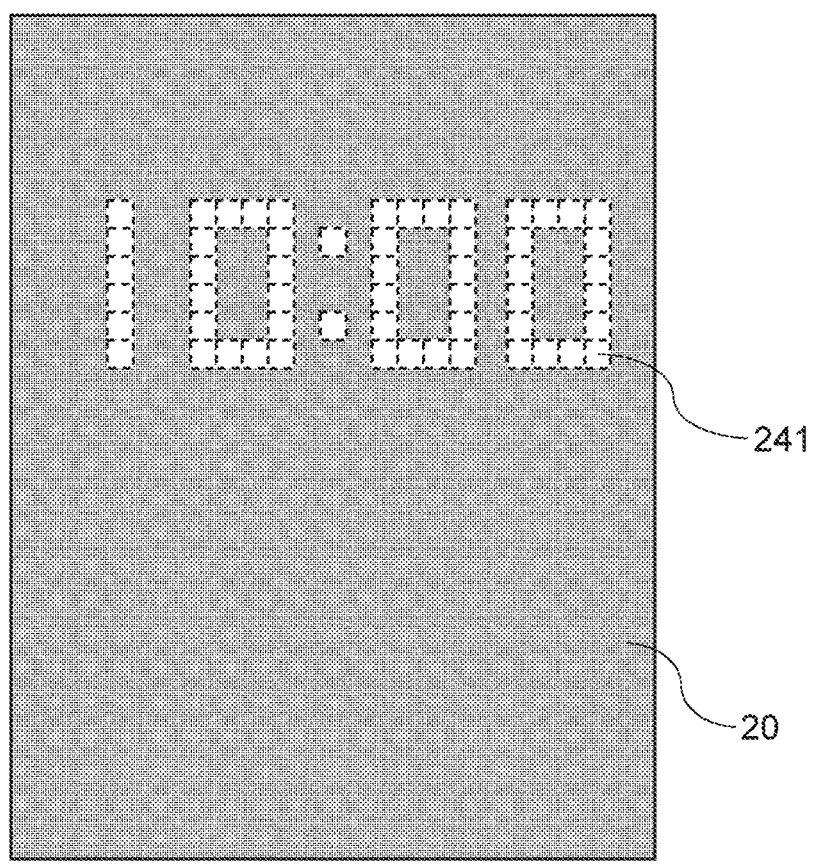
FIG. 8 is a schematic diagram illustrating a manner in which an image is displayed on a portable terminal in a standby state.

An explanation is given below as to an example of a manner in which the liquid crystal panel 20 displays an image in the power saving operation mode. FIG. 8 is a schematic diagram illustrating a manner in which an image is displayed on a portable terminal 100 in the standby state. As shown in FIG. 8, the portable terminal 100 is provided with the liquid crystal panel 20. Note that in FIG. 8, the portable terminal 100 and the liquid crystal panel 20 are in the standby state, and the liquid crystal panel 20 is operating in the power saving operation mode. Also note that in FIG. 8, in an image displayed on the liquid crystal panel 20, counter electrodes 241 included in a white area are each denoted by being surrounded by a broken line, and the other remaining black area is denoted by dots.

As shown in FIG. 8, the liquid crystal panel 20 displays an image even in the standby state. In FIG. 8, an image indicating a current time is displayed by way of example on the liquid crystal panel 20. In this case, a user can get to know the current time simply by looking at the liquid crystal panel 20 in the standby state without operating the portable terminal such as pressing the power button.

As described above, the liquid crystal panel 20 is capable of performing displaying (AOD: Always On Display) even in the standby state. Furthermore, as shown in FIG. 8, the liquid crystal panel 20 is capable of displaying an image using all the counter electrodes 241 even in operating in the power saving operation mode. Therefore, the liquid crystal panel 20 has no limitation on the area for displaying an image even in the standby state.

As described above, the liquid crystal panel 20 operates in the power saving operation mode as well as the normal operation mode. Since the counter electrodes 241 are smaller in number than the pixel electrodes 221, the number of times a change occurs in the voltage applied to the electrodes in the power saving operation mode is smaller than in the normal operation mode. Therefore, the power consumption is lower in the power saving operation mode than in the normal operation mode. Furthermore, in the power saving operation mode, although the resolution is lower than that in the normal operation mode, an image can be displayed with no restriction on the area in which the image is displayed. Thus, operating in the power saving operation mode makes it possible for the liquid crystal panel 20 to provide a sufficient display performance while reducing power consumption.

Second Embodiment

Next, a second embodiment is described. Note that, in the following description, a part similar to that in the first embodiment is denoted by a similar reference numeral to that used in the first embodiment, and a description of the similar part already described in the first embodiment is not given again unless necessary. In the following description, differences between the second embodiment and the first embodiment are explained, but similar points are not described again.

Figure 9:
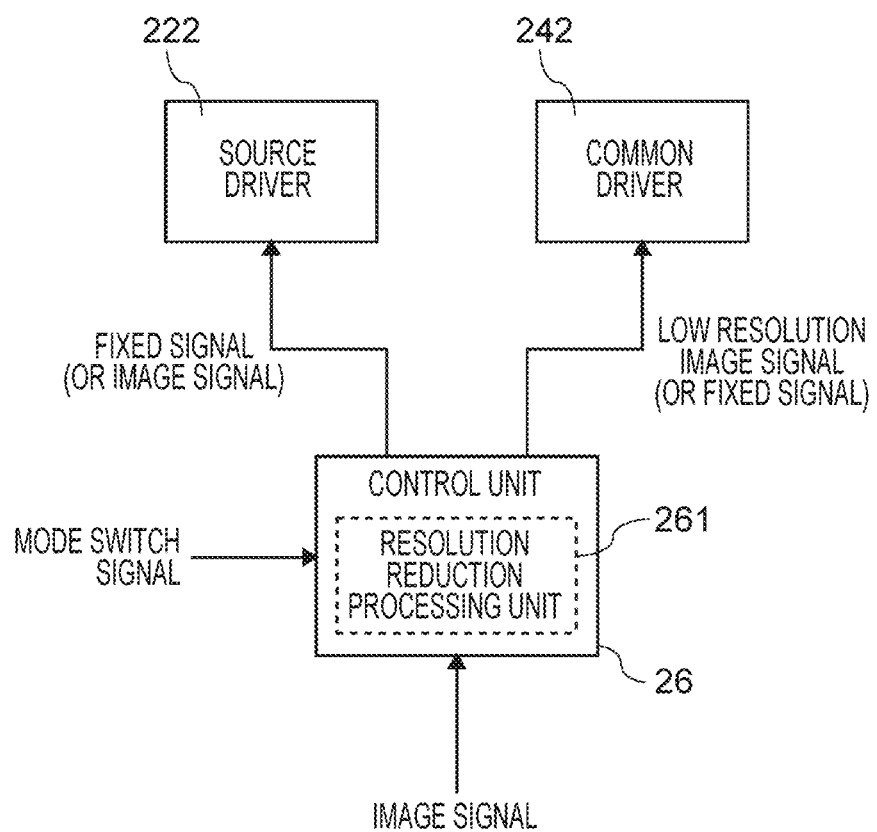
FIG. 9 is a block diagram illustrating a control unit provided in a liquid crystal panel according to a second embodiment.

FIG. 9 is a block diagram illustrating a control unit 26 provided in a liquid crystal panel 20 according to the second embodiment. As shown in FIG. 9, in the second embodiment, the control unit 26 includes a resolution reduction process unit 261. The resolution reduction process unit 261 performs a process to reduce the resolution of an image signal. The resolution reduction process unit 26 reduces the resolution of the image signal, for example, by using a method in which pixel values of pixels which are adjacent in an image displayed according to the image signal are averaged thereby reducing the number of pixels, or a method in which pixels are deleted at predetermined intervals as seen in a displayed image.

In operation in the normal operation mode, the control unit 26 supplies an image signal to the source driver 222. On the other hand, in operation in the power saving operation mode, the control unit 26 supplies, to the common driver 242, a low-resolution image signal obtained as a result of the resolution reduction process performed by the resolution reduction process unit 261. Here, the low-resolution image signal supplied to the common driver 242 is an image signal having a resolution in which one counter electrode 241 corresponds to one pixel.

As described above, the provision of the resolution reduction process unit 261 in the control unit 26 makes it possible to reduce the resolution of even an image signal with a high resolution supposed to be displayed in the normal operation mode and display the resultant low-resolution image in the power saving operation mode. That is, the liquid crystal panel 20 is capable of displaying an arbitrary image signal in the power saving operation mode.

Modifications

Note that the above-described embodiments are merely examples for carrying out the present invention. That is, the present invention is not limited to the above-described embodiments, and the above-described embodiments may be appropriately modified without departing from the spirit and the scope of the present invention.

For example, in the example described above with reference to FIG. 1, the liquid crystal panel 20 is provided in the transmissive liquid crystal display apparatus 1 including the backlight 10. However, the liquid crystal panel 20 may be provided in a reflective or semi-transmissive liquid crystal display apparatus. In a case where the liquid crystal panel 20 is disposed on these liquid crystal display apparatuses, a further reduction in power consumption may be achieved by not using the backlight 10 or by reducing the amount of light emitted by the backlight 10 in the standby state.

In the above-described embodiments, it is assumed by way of example that the liquid crystal panel 20 operates in the power saving operation mode when the liquid crystal panel 20 is in the standby state. However, the liquid crystal panel 20 may operate in the power saving operation mode in a state other than the standby state. For example, in a case where the liquid crystal panel 20 is disposed on a portable terminal, when a remaining battery capacity becomes less than a predetermined threshold value, or when a user inputs an instruction to operate in the power saving operation mode, the liquid crystal panel 20 may operate in the power saving operation mode.

The counter electrodes 241 may be used as electrodes of the touch panel. For example, the control unit 26 may detect a touch operation and a touched position based on voltage changes of the counter electrodes 241 detected via the common driver 242. Note that "touch" is detected when an indicator such as a finger or a touch pen is in contact with or close to a surface of the liquid crystal panel 20.

When a finger is in contact with the surface of the liquid crystal panel 20, an increase occurs in capacitance of counter electrodes 241 near the finger, which results in a reduction in a voltage change that occurs in response to an application of a voltage to the counter electrodes 241. In view of the above, the common driver 242 supplies a voltage to the counter electrodes 241, and a voltage change that occurs in response is detected. Then, the control unit 26 detects whether a touch operation is performed and detects a touch position based on the voltage change detected on the counter electrodes 241. Alternatively, a voltage with a predetermined pattern for detecting a touch may be applied from the common driver 242 to the counter electrodes 241 periodically for a short period, and a voltage change that occurs in response may be detected. In this case, it is possible to detect a touch operation and a touch position without influencing displaying of the image by the liquid crystal panel 20.

The sizes of the pixel electrodes 221 may be equal as shown by way of example in FIG. 2, and the sizes of the counter electrodes 241 may be equal as shown by way of example in FIG. 3. However, the sizes may not be equal. For example, the sizes of the counter electrodes 241 may not be equal. However, in order to increase the degree of freedom in displaying an image on the liquid crystal panel 20 in the power saving operation mode, it is preferable that the sizes of the counter electrodes 241 are equal.

Aspects of the liquid crystal panel described above can be summarized as follows.

The liquid crystal panel includes a plurality of pixel electrodes, a plurality of counter electrodes which are smaller in number and larger in individual size than the plurality of pixel electrodes, a liquid crystal layer disposed between the plurality of pixel electrodes and the plurality of counter electrodes, and a control unit configured to control a voltage applied to the plurality of pixel electrodes and a voltage applied to the plurality of counter electrodes, wherein in a predetermined case, the control unit operates in a power saving operation mode in which the control unit performs control such that a fixed voltage is applied to the plurality of pixel electrodes and a voltage corresponding to an image signal is applied to the plurality of counter electrodes(first aspect).

According to this aspect, it is possible to operate in the power saving operation mode in the predetermined case. Since the number of counter electrodes is smaller than the number of pixel electrodes, the number of times a change occurs in the voltage corresponding to the image signal applied to the counter electrodes in the power saving operation mode is smaller than the number of times a change occurs in the voltage corresponding to the image signal applied to the pixel electrodes in the normal operation mode. Therefore, the power consumption is lower in the power saving operation mode than in the normal operation mode. Furthermore, in the power saving operation mode, although the resolution is lower than that in the normal operation mode, an image can be displayed without a restriction on the area in which the image is displayed. Therefore, operating in the power saving operation mode makes it possible for the liquid crystal panel to provide a sufficient display performance while reducing power consumption.

In the liquid crystal panel according to the first aspect, in a case where a signal for causing into a standby state is input, the control unit may operate in the power saving operation mode (second aspect). This aspect makes it possible to perform displaying (AOD) even when the liquid crystal panel is in the standby state.

In the liquid crystal panel according to the first or second aspect, the control unit may include a resolution reduction process unit configured to reduce a resolution of an image signal, wherein when the control unit operates in the power saving operation mode, the control unit may perform control such that a voltage corresponding to the image signal with the resolution reduced by the resolution reduction process unit is applied to the plurality of counter electrodes(third aspect). According to this aspect, it is possible to reduce the resolution of even an image signal with a high resolution supposed to be displayed in the normal operation mode and display the resultant low-resolution image in the power saving operation mode. That is, the liquid crystal panel is capable of displaying an arbitrary image signal in the power saving operation mode.

In the liquid crystal panel according to one of the first to third aspects, the liquid crystal panel may further include a common driver configured to detect a voltage change that occurs when a voltage is applied to each of the plurality of counter electrodes, wherein the control unit detects whether touching is performed or not and detects a touched position based on the voltage change detected by the common driver(fourth aspect). According to this aspect, the counter electrodes can be used as electrodes of a touch panel.

The present disclosure contains subject matter related to that disclosed in U.S. Provisional Patent Application No. 62/867,248 filed in the US Patent Office on Jun. 27, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal panel comprising:
a plurality of pixel electrodes;
a plurality of counter electrodes which are smaller in number and larger in individual size than the plurality of pixel electrodes;
a liquid crystal layer disposed between the plurality of pixel electrodes and the plurality of counter electrodes; and
a control unit configured to control a voltage applied to the plurality of pixel electrodes and a voltage applied to the plurality of counter electrodes,
wherein in a predetermined case, the control unit operates in a power saving operation mode in which the control unit performs control such that a fixed voltage is applied to the plurality of pixel electrodes and a voltage corresponding to an image signal is applied to the plurality of counter electrodes.

2. The liquid crystal panel according to claim 1, wherein in a case where a signal for causing into a standby state is input, the control unit operates in a power saving operation mode.

3. The liquid crystal panel according to claim 2, wherein
the control unit includes a resolution reduction process unit configured to reduce a resolution of an image signal, and
wherein when the control unit operates in the power saving operation mode, the control unit performs control such that a voltage corresponding to the image signal with the resolution reduced by the resolution reduction process unit is applied to the plurality of counter electrodes.

4. The liquid crystal panel according to claim 2, further comprising
a common driver configured to detect a voltage change that occurs when a voltage is applied to each of the plurality of counter electrodes,
wherein the control unit detects whether touching is performed or not and detects a touched position based on the voltage change detected by the common driver.

5. The liquid crystal panel according to claim 1,
wherein
the control unit includes a resolution reduction process unit configured to reduce a resolution of an image signal, and
wherein when the control unit operates in the power saving operation mode, the control unit performs control such that a voltage corresponding to the image signal with the resolution reduced by the resolution reduction process unit is applied to the plurality of counter electrodes.

6. The liquid crystal panel according to claim 5, further comprising
a common driver configured to detect a voltage change that occurs when a voltage is applied to each of the plurality of counter electrodes,
wherein the control unit detects whether touching is performed or not and detects a touched position based on the voltage change detected by the common driver.

7. The liquid crystal panel according to claim 1,
further comprising
a common driver configured to detect a voltage change that occurs when a voltage is applied to each of the plurality of counter electrodes,
wherein the control unit detects whether touching is performed or not and detects a touched position based on the voltage change detected by the common driver.

* * * * *